June 2, 1970     P. J. STOBBE     3,514,873
EDUCATIONAL DEVICE FOR INDIVIDUAL STUDENT USE
Filed Sept. 16, 1968     3 Sheets-Sheet 1
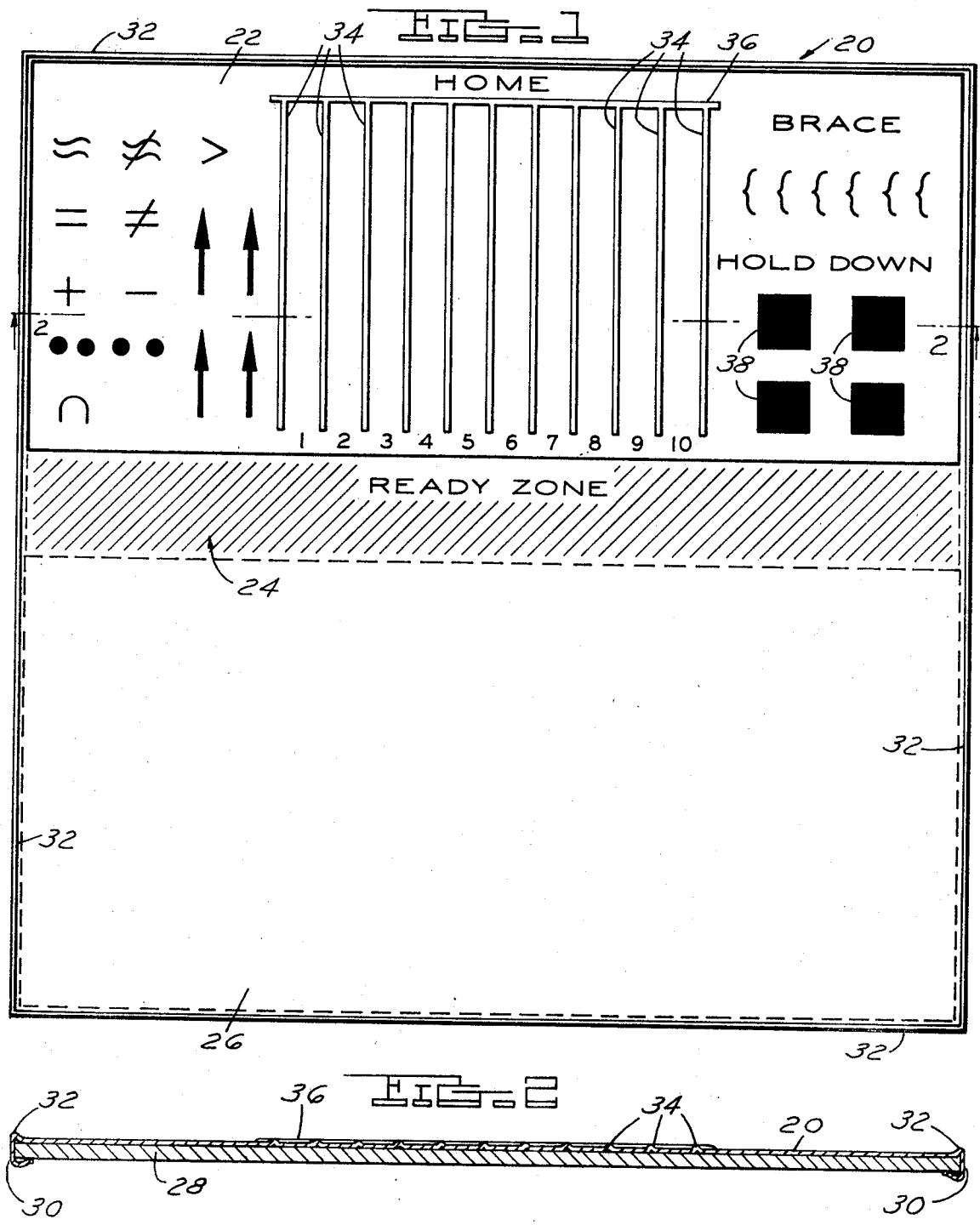
INVENTOR
PAUL J. STOBBE

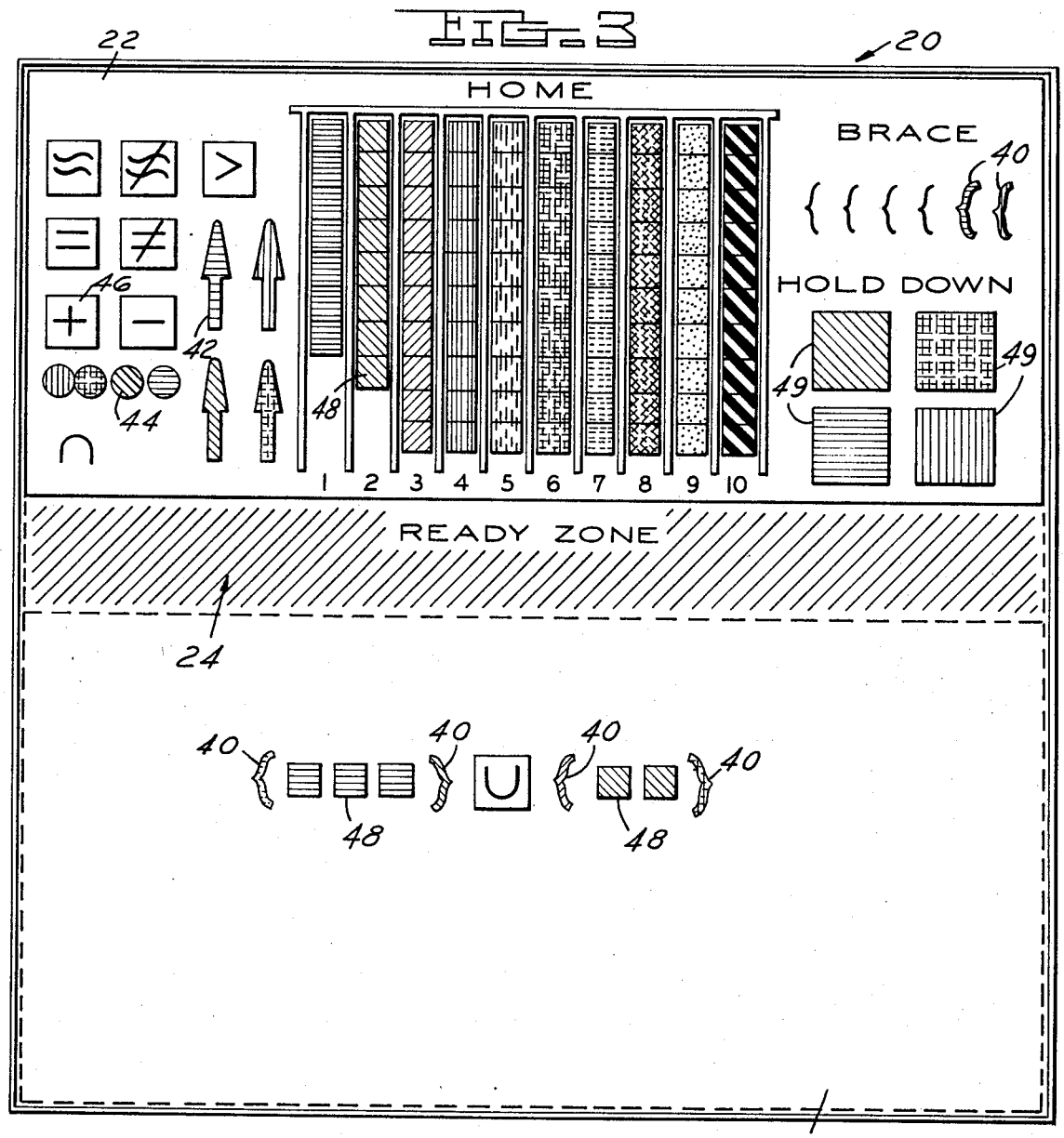

June 2, 1970 P. J. STOBBE 3,514,873
EDUCATIONAL DEVICE FOR INDIVIDUAL STUDENT USE
Filed Sept. 16, 1968 3 Sheets-Sheet 3
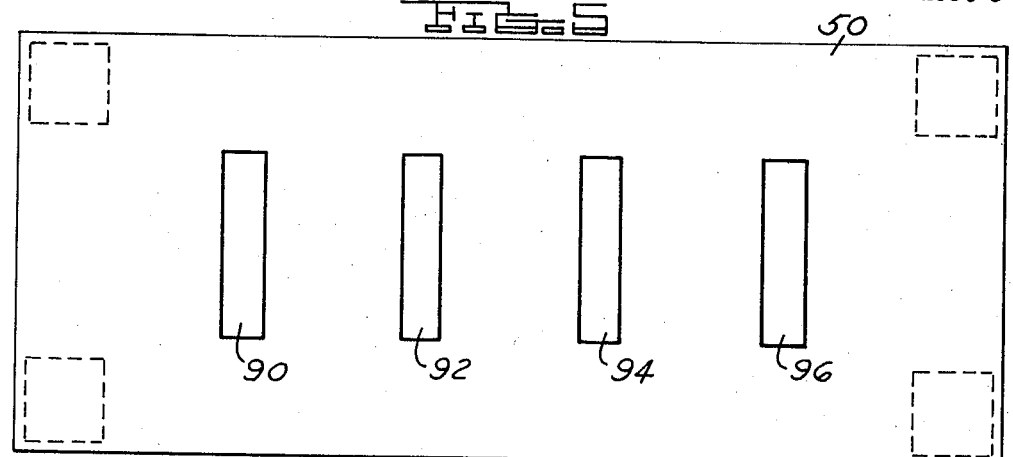
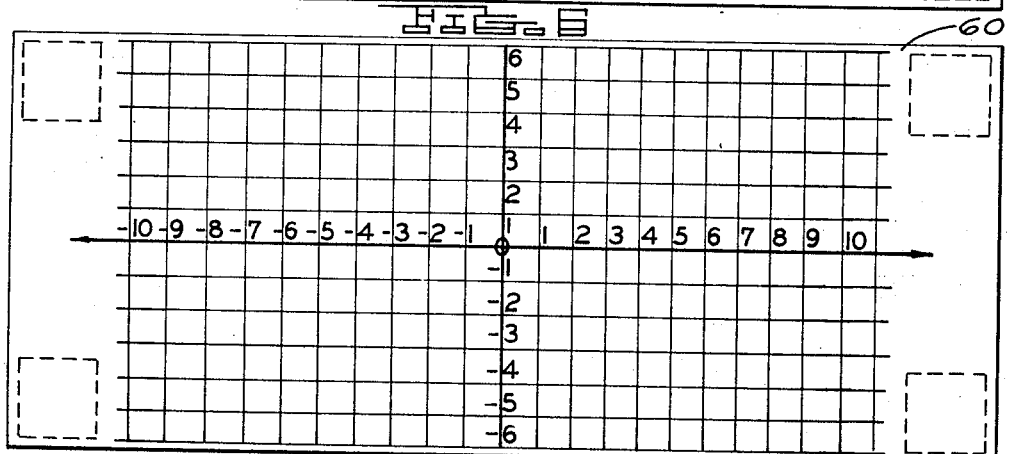
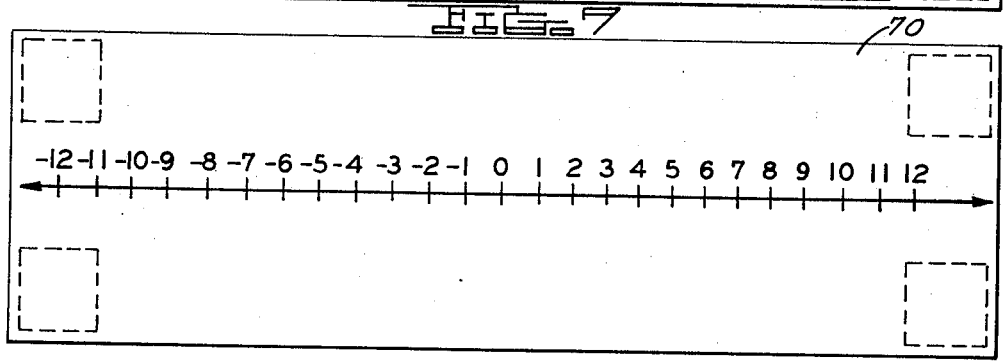
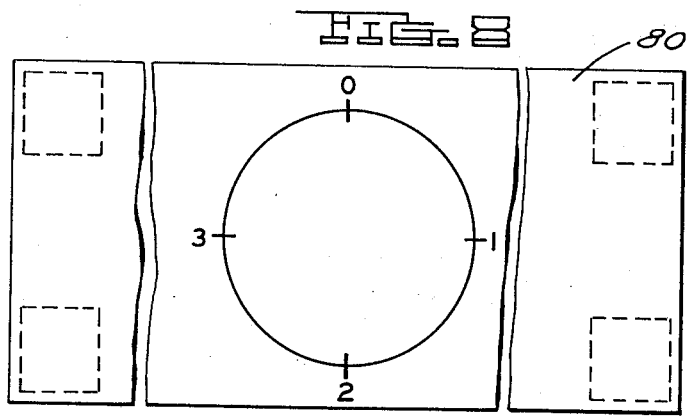
INVENTOR
PAUL J. STOBBE
BY Barnes, Kisselle,
Raisch & Choate
ATTORNEYS

United States Patent Office 3,514,873
Patented June 2, 1970

---

3,514,873
EDUCATIONAL DEVICE FOR INDIVIDUAL STUDENT USE
Paul J. Stobbe, 20212 Braille, Detroit, Mich. 48219
Filed Sept. 16, 1968, Ser. No. 759,894
Int. Cl. G09b *1/08;* G09f *7/04*
U.S. Cl. 35—31                     8 Claims

ABSTRACT OF THE DISCLOSURE

An educational device for individual student use comprising a board and a series of mathematical elements in the form of symbols, units and so on which are held on the board by a force added to gravity such as magnetic attraction, the board having defined areas for storage of the symbols and elements and the presentation of the units and elements, the storage area having positioning channels for guiding and locating the elements for storage.

---

This invention relates to an educational device for individual student use, it being desirable that each child be able to manipulate various mathematical symbols and magnetic elements and units at an early age, perhaps even before the child has learned to write numbers and letters with facility.

It is an object of the invention to teach not only the basic fundamentals of mathematical operations of addition, subtraction, multiplication and division but also other mathematical topics now taught in the elementary school.

In the past, children have been taught mathematics by reference to apples, oranges and so on but specialists in the field of education in mathematics have recognized the need for children to be able to manipulate concrete objects before manipulating abstract symbols such as numbers.

With the coming emphasis on acceleration of mathematical education to bringing a child up to various stages at an earlier age than has been characteristic in the past in order to reach the facility for the comprehension of computer logic and higher mathematics which is now almost a basic tool, it is essential that education be improved in the earlier years to provide a solid base for the more complicated and more extended mathematical comprehension which is to follow.

In many cases under previous methods, it has been the teacher who has been the demonstrator and the children have, by necessity, had to watch the teacher without being able to participate physically. For this reason, most demonstration devices have been designed for teacher use. Other devices require specialized training by the teacher and are coordinated for use with a specific textbook or workbook.

Accordingly, it is an object of the present invention to permit each pupil to utilize his tactical sensory apparatus as well as his visual and auditory senses in learning the basic mathematics and new mathematics which are being taught today.

Another object is to enable the student to see that abstract mathematical symbols represent the concrete objects which he himself can manipulate on the board.

A further object is to use the invention to teach many mathematical topics, that is, sets, properties of numbers, addition, subtraction, multiplication, division, fractions, other systems of numeration, integers and coordinate systems.

A further and important object is the provision of a teaching aid which will elicit total response whereby every student is being creative to the fullest extent of his ability.

Another object is the use of the educational device to supplement the progress of the slow learner so that he may continue to use the device as an aid while graduating to pencil and paper problems.

It will be apparent that the device is such that the teacher can almost instantly determine the progress of each student by having the student hold the board up or by moving through the room to observe it as the children discover concepts.

Another advantage of the device is that any teacher can utilize the invention without the need of the purchase of supplemental textbooks or workbooks and without any specialized training or instruction.

A further object is the provision of a device which can be readily examined to make sure that all of the parts are in place and which is so designed that a multiplicity of the units can be readily stacked and stored, all this being accomplished in a device which is relatively inexpensive and therefore well within the budget of any public school.

Other objects and features of the invention will appear in the following description and claims in which the basic principle of the invention is disclosed together with the best mode contemplated by the inventor.

Drawings accompany the disclosure and the various views thereof may be briefly described as:

FIG. 1 a plan view of the basic plate showing the respective areas.

FIG. 2, a sectional view on line 2—2 of FIG. 1.

FIG. 3, a plan view of the plate showing the symbols in place at the storage area.

FIG. 4, an enlarged view of certain of the symbols.

FIGS. 5, 6, 7 and 8, views of ancillary sheets that may be selectively utilized on the work zone of the basic plate.

Referring to the drawings:

In FIG. 1, the base plate 20 is shown in plan having a storage area 22, a ready zone 24 and a work zone or area 26. The base plate is preferably formed of a thin sheet of ferrous metal which has a non-magnetic reinforcing core 28 such as fiberboard, the edges of the plate being folded around the core at 30. At the edges of the plate on all sides the metal is raised to form a retaining ridge 32. In the storage area 22 the plate is raised in spaced ridges 34 to provide ten channels for storage of units. One end of the channels is closed by a retaining ridge 36 to provide a stop for the units as they are moved into the respective channels.

The storage area 22 also has marked thereon, in the form of indicia, storage spots for various mathematical symbols such as plus (+), minus (−), equal (=), not equal (≠) and so on. Spots 38 are provided for hold-down elements for the ancillary sheets.

In FIG. 3, the storage zone 22 is shown filled with the respective elements utilized in the educational device. These elements are preferably formed of a magnetic material such as a synthetic flexible rubber which contains magnetic particles so that it will cling to a sheet metal face formed of iron or steel or some other magnetic material such as is used to form the sheet 20.

Certain of these elements are shown in FIG. 4 where there is illustrated a brace 40, an arrow 42, a circular dot 44, a plus sign 46, and a counting unit 48. The ten channels in the storage area between the ridges 34 are each filled with ten unit elements and the elements in each channel have a distinctive color as illustrated by the various cross hatchings in FIG. 3. These channels are numbered 1 to 10. It will be noted that in FIG. 3, three of the elements from channel 1 have been placed on the work area and two of the elements from channel 2 have been placed in the work area along with a mathematical symbol. Also, four braces from the upper right-hand portion of the storage area have been utilized. The synthetic rubber pieces used for the mathematical symbols and units are preferably filled with particles of berrium ferrite which is permanently magnetized and the coloring on the units will obviously be of a non-toxic paint or decal, or a cover sheet of paper or plastic.

To illustrate a few of the many ways the device can be used, the kindergarten teacher may be developing the concept that numbers can be compared to each other as to size. She may issue the oral instructions—"Show me a yellow set whose number named is 2"—and the child can move two of the yellow units down into the work area. She can then say—"Show me a red set whose number name is 5"—and the child can move five of the red units into the work area. She can then question the student—"How do you know that five is larger than two?"—and the child, by manipulating the set, can explain this in terms of length or area and so on.

In a higher grade such as third grade, a teacher may be interested in developing a concept of the commutative property of multiplication and she can say—"Show me a 3 x 4 array"—and the student may then move 12 units down into the work area and arrange them in a rectangle having three units in one direction and four in the other. The teacher can now say—"Hold up your board and give it a ¼ turn clockwise. What do you notice about your array now?" The child will note, of course, that instead of a 3 x 4 arrangement he now has a 4 x 3 arrangement and so on.

In a still higher grade, the children can develop the concept of integers by securing a printed form of a number line containing positive and negative numbers such as shown, for example, in the respective sheets in FIGS. 6 and 7. This form can be placed in the work area 26 and held down by the magnetic hold-down elements 49 shown in the lower right-hand corner of the storage area. By using the hold-downs and the various color arrows 42, the student can demonstrate, for example, that 3 plus a negative 4 equals a negative 1. Thus, the device is usable not only in the very elementary grades but on up through the elementary grades and perhaps even early junior high.

In FIGS. 5, 6, 7 and 8, ancillary sheets 50, 60, 70 and 80 are shown. The sheet 50, for example, in FIG. 5 can be used for a base 5 counting system, each rectangle 90, 92, 94 and 96 having space for five units from the storage area. Thus, a student can be taught how to count in base 5.

The ancillary sheet 60 shown in FIG. 6 can be used to teach negative numbers and also the X, Y coordinates, both positive and negative. The sheet 70 in FIG. 7 can be used for teaching addition and subtraction in negative numbers. The sheet 80 in FIG. 8 can be used for the teaching of modulo arithmetic which leads to an understanding of the abstract structure of our number system.

When the student is finished with the device, it will be seen that all of the elements can be readily replaced in their proper position and it will be easy to check a unit to determine whether all of the parts are available. The use of the non-magnetic core 28 makes it possible to stack the elements without the particular units being separated from the base plates. The ridges or beads 34 facilitate the storage of the different colored elements and the replacement of these elements into the various channels 1 to 10. The separating ridges or beads make it very easy to move these elements back into their storage area and to keep them separated a sufficient distance that three is no magnetic attraction which will cause a mixing of the units or make it difficult to remove elements from any particular channel.

Preparatory to an exercise, a teacher may instruct the student to place in the ready zone 24 a certain number of symbols and units such as a plus or a minus or division signs, equal signs, and a certain number of units such as six red and six green, etc. Thus, the exercise may be more readily carried out with this preparation.

In the appended claims, I have attempted to delineate the novelty of my device over known prior art for the purpose of defining the protected area as well as notifying the public relative to the unprotected area. However, I do intend by this claiming to cover any colorable variations, reversal of parts, or equivalents of the device which are within the scope and spirit of this disclosure and not anticipated by the prior art.

What is claimed as new is as follows:

1. An educational device for the teaching of mathematical concepts and relationships which comprises:
    (a) a demonstration board for the use of individual students composed of a sheet of magnetically attractable material having a storage area and a working area, the storage area having indicia thereon to designate storage spaces for a variety of mathematical symbols, and upstanding beads formed in said storage area in a series of spaced parallel ridges to define channels for the storage of multiple units for mathematical representation, and
    (b) a plurality of individually manipulatable mathematical symbols and units formed of a magnetically attractable material arranged to be stored at the individual indicia on the storage area which correspond to the symbols, said units being storable in the channels of said storage area,
        one of said materials being magnetized to create a mutual attraction between said board and said symbols and units.

2. An educational device as defined in claim 1 in which a sheet of non-magnetic material is laminated to said board to prevent misattraction of units and symbols when said boards are vertically stacked.

3. An educational device as defined in claim 1 in which means on the edges of said board are provided to create a retaining ridge around said board for said symbols and units.

4. An educational device as defined in claim 1 in which the working area is positioned adjacent the storage area and a plurality of ancillary sheets bearing mathematical indicia may be placed selectively on said working area to increase the effective use of the device, and a plurality of hold-down elements are provided to position the sheets during use.

5. An educational device for the teaching of mathematical concepts and relationships which comprises:
    (a) a demonstration board,
    (b) a plurality of individually manipulatable elements representing mathematical symbols and units in the form of pieces having a thickness which enables a student to lift and shift the elements on the demonstration board.
    (c) means to create a magnetic attraction between said board and said elements,
        said board having formed in one area thereof a plurality of adjacent storage channels created by raised portions on said board to facilitate the storage and separation of unit elements in groups when not in use.

6. An educational device for the teaching of mathematical concepts and relationships as defined in claim 5 in which the board is formed of sheet steel and the elements are formed of magnetized material, and said storage channels are formed by spaced beads raised in the surface of said sheet steel.

7. A device as defined in claim 6 in which confining edges are formed on the edges of said board by upturned edges in said sheet steel.

8. A device as defined in claim 7 in which portions of said sheet steel outside said upturned edges are turned under to clamp the edges of a non-magnetic base core sheet underlying said board.

References Cited

UNITED STATES PATENTS

| 1,471,437 | 10/1923 | Wood | 35—73 X |
|---|---|---|---|
| 1,842,881 | 1/1932 | Purcell | 35—73 X |
| 2,871,594 | 2/1959 | Halpert. | |
| 3,156,056 | 11/1964 | Pribil. | |
| 3,461,573 | 8/1969 | Stibal | 35—34 |

EUGENE R. CAPOZIO, Primary Examiner

W. H. GRIEB, Assistant Examiner

U.S. Cl. X.R.

35—7; 40—142